(12) United States Patent
Hwang et al.

(10) Patent No.: US 7,333,322 B2
(45) Date of Patent: Feb. 19, 2008

(54) DISPLAY APPARATUS

(75) Inventors: Kwang-sung Hwang, Suwon-si (KR); Gyu Jung, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 441 days.

(21) Appl. No.: 11/125,126

(22) Filed: May 10, 2005

(65) Prior Publication Data

US 2005/0254204 A1 Nov. 17, 2005

(30) Foreign Application Priority Data

May 12, 2004 (KR) ...................... 10-2004-0033320

(51) Int. Cl.
*G06F 1/16* (2006.01)
(52) U.S. Cl. ...................... 361/681; 248/917
(58) Field of Classification Search .............. 361/681; 248/917–921
See application file for complete search history.

(56) References Cited

U.S. PATENT DOCUMENTS

| | | | | |
|---|---|---|---|---|
| 4,438,458 A | * | 3/1984 | Munscher | 361/681 |
| 5,335,142 A | * | 8/1994 | Anderson | 361/681 |
| 5,566,424 A | | 10/1996 | Crompton et al. | |
| 5,812,368 A | * | 9/1998 | Chen et al. | 361/681 |
| 6,031,714 A | * | 2/2000 | Ma | 361/681 |
| 6,064,373 A | * | 5/2000 | Ditzik | 345/173 |
| 6,134,103 A | * | 10/2000 | Ghanma | 361/681 |
| 6,400,560 B1 | * | 6/2002 | Chian | 361/681 |
| 6,430,038 B1 | * | 8/2002 | Helot et al. | 361/681 |
| 6,443,408 B1 | | 9/2002 | Hung | |
| 6,510,049 B2 | * | 1/2003 | Rosen | 361/681 |
| 6,676,098 B2 | * | 1/2004 | Lin | 248/371 |
| 6,912,121 B2 | * | 6/2005 | Karidis et al. | 361/681 |
| 2005/0088808 A1 | * | 4/2005 | Michoux et al. | 361/681 |

FOREIGN PATENT DOCUMENTS

| | | |
|---|---|---|
| JP | 2004-116540 A | 4/2004 |
| KR | 20-295981 | 11/2002 |
| KR | 2003-58204 A | 7/2003 |
| KR | 20-327070 | 9/2003 |

OTHER PUBLICATIONS

-International Search Report dated Mar. 31, 2005 PCT/KR2004/003507(listing 3 references).

* cited by examiner

*Primary Examiner*—Lisa Lea-Edmonds
(74) *Attorney, Agent, or Firm*—Stanzione & Kim, LLP

(57) ABSTRACT

A display apparatus includes a display main body, a base, a stand to link the display main body with the base, and a hinge rotatably connected to the base and the stand to allow the stand to be rotated about the base, the hinge comprising a shaft supported by the stand, rotatably coupled to the base, and formed with a contact portion on an outer circumference thereof, and a friction unit inserted in the base, surrounding the outer circumference of the shaft, and comprising a friction supporting portion to frictionally support the shaft being rotated when the display main body is operated, and a rotation holding portion to elastically contact the contact portion of the shaft when the display main body is in a folded state, and to hold the shaft from rotating. In the display apparatus, the display main body is smoothly operated when lifted, and is stably kept in the folded state.

20 Claims, 8 Drawing Sheets

DISPLAY APPARATUS

CROSS-REFERENCE TO RELATED APPLICATIONS

This application claims the benefit of Korean Patent Application No. 2004-33320, filed May 12, 2004, in the Korean Intellectual Property Office, the disclosure of which is incorporated herein by reference.

BACKGROUND OF THE INVENTION

1. Field of the Invention

The present general inventive concept relates to a display apparatus, and more particularly, to a display apparatus in which a stand has a dual hinge structure, so that the display apparatus can be used as a wall-mounting type display apparatus.

2. Description of the Related Art

A display apparatus comprehensively includes various devices which can visually represent data, such as a character and a graphic, on a display panel.

Such a display apparatus has been generally used as being stood on a table or the like. The display apparatus may have a dual hinge structure which not only allows a display main body to be completely folded and easily packed but also allows the display apparatus to be mounted to a wall or the like.

In most conventional display apparatuses with the dual hinge structure, a friction equally acts regardless of a lifting operation or a folded state of a display main body. Therefore, in a case where the friction is relatively large, the folded state of the display main body is stably kept when the display apparatus is packed or mounted to the wall, but it is difficult to smoothly lift the display main body.

Oppositely, in a case where the friction is relatively small, the display main body can be smoothly lifted, but it is difficult to stably keep the folded state of the display main body due to a repulsive force of a torsion spring.

To solve the above-mentioned problems, a separate unit such as a holding bracket is additionally needed for binding a base forcibly when the display apparatus is packed or mounted to the wall. However, in this case, the display apparatus is decreased in functionality and usability and is increased in production cost.

SUMMARY OF THE INVENTION

In order to solve the foregoing and/or other problems, it is an aspect of the present general inventive concept to provide a display apparatus, in which a monitor main body is smoothly operated when lifted, and is stably kept in a folded state.

Additional aspects and advantages of the present general inventive concept will be set forth in part in the description which follows and, in part, will be obvious from the description, or may be learned by practice of the general inventive concept.

The foregoing and/or other aspects of the present general inventive concept may be achieved by providing a display apparatus comprising a display main body, a base, a stand to link the display main body to the base, and a hinge unit rotatably connected to the base and the stand and to allow the stand to be rotated about the base, the hinge unit comprising a shaft supported by the stand, rotatably coupled to the base, and formed with a contact portion on an outer circumference thereof, and a friction unit inserted in the base, surrounding the outer circumference of the shaft, and comprising a friction supporting portion to frictionally support the shaft being rotated when the display main body is operated, and a rotation holding portion to elastically contact the contact portion of the shaft when the display main body is in a folded state, and to hold the shaft from rotating.

According to an aspect of the present general inventive concept, the contact portion may be flat and formed along a longitudinal direction of the shaft, and the rotation holding portion can be bent from the friction supporting portion to be in surface-contact with the contact portion.

According to another aspect of the present general inventive concept, the friction unit may comprise a clip spring.

According to yet another of the present general inventive concept, the base may comprise a base main body, and a supporting bracket detachably coupled to a portion of the base main body and formed with an insertion hole in which the shaft and the friction unit are inserted.

BRIEF DESCRIPTION OF THE DRAWINGS

The above and/or other aspects and advantages of the present general inventive concept will become apparent and more readily appreciated from the following description of the embodiments, taken in conjunction with the accompany drawings of which.

DETAILED DESCRIPTION OF THE PREFERRED EMBODIMENTS

Figure 1:
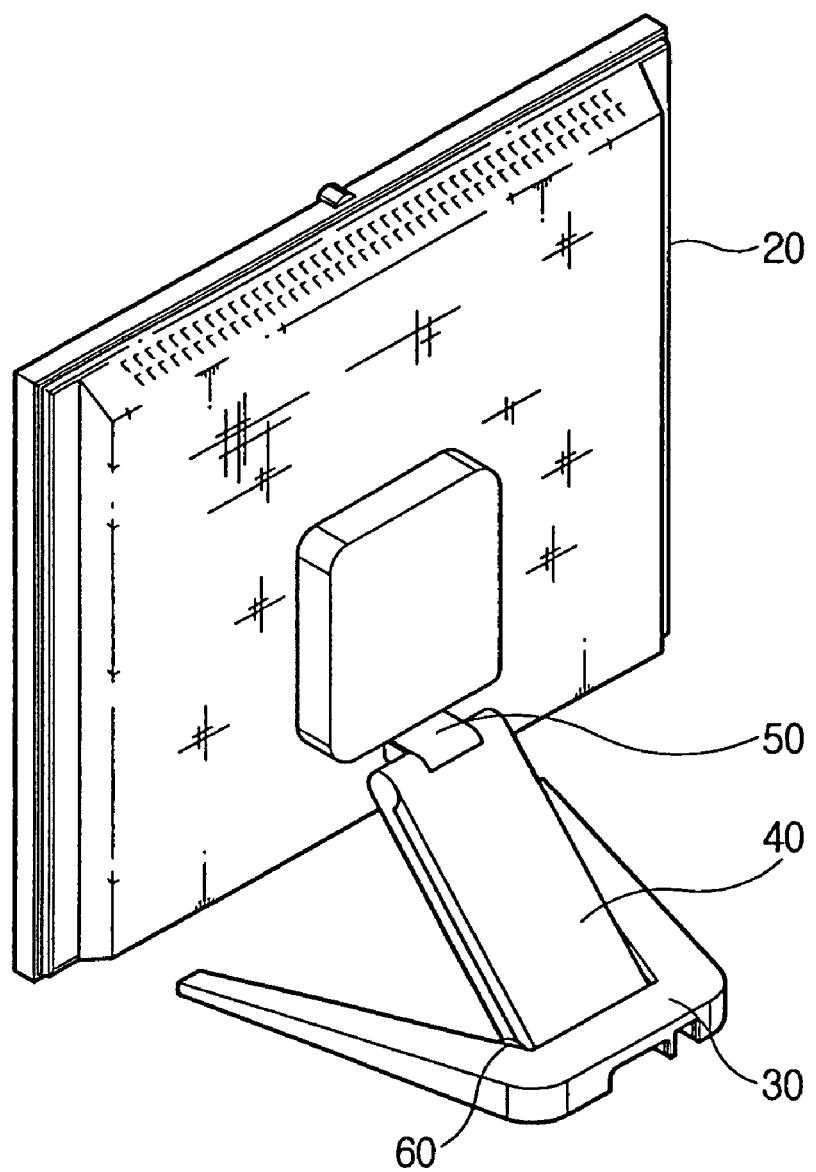
FIG. 1 is a rear perspective view illustrating a display apparatus according to an embodiment of the present general inventive concept.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Figure 2:
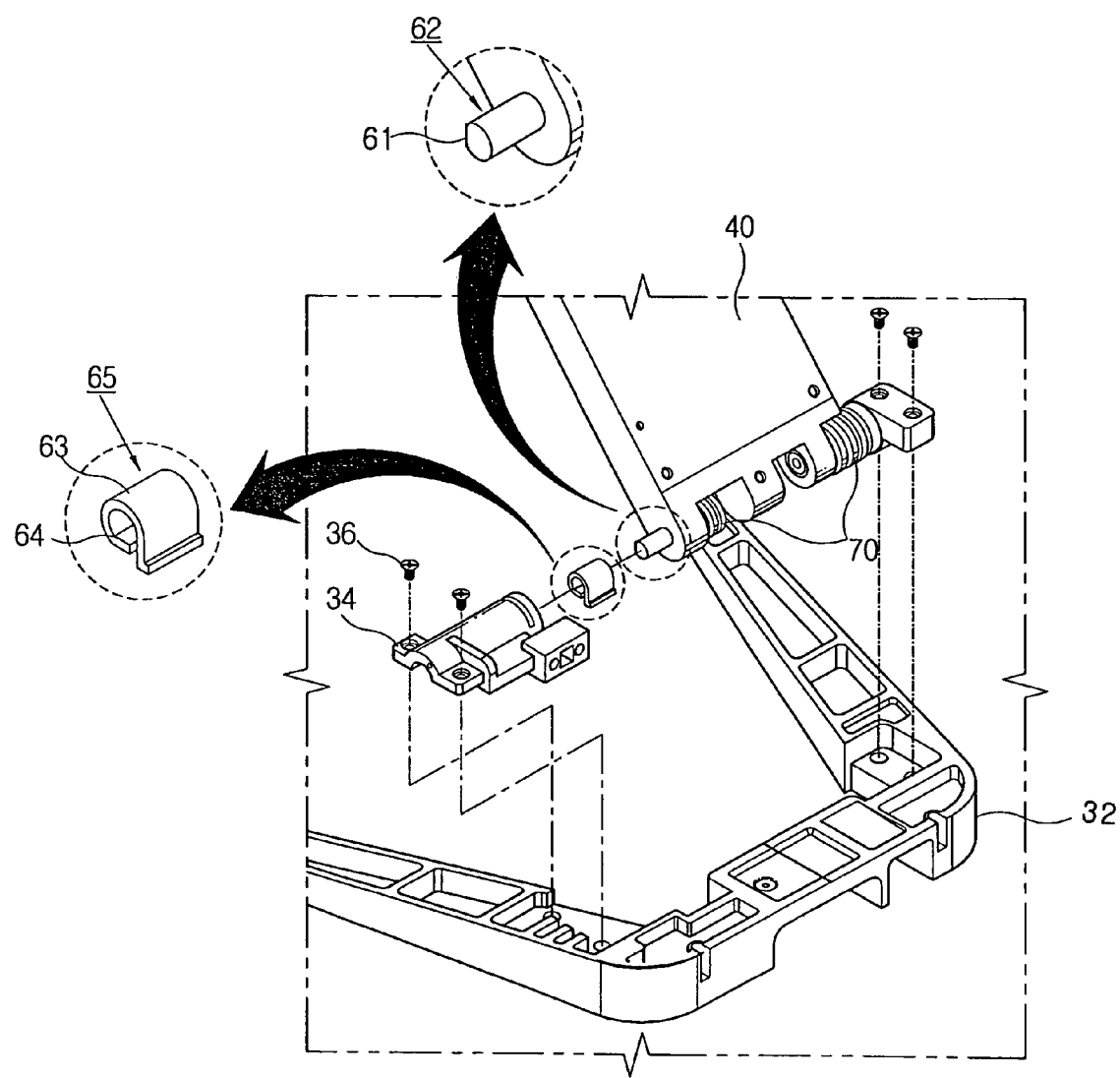
FIG. 2 is a partially exploded perspective view illustrating a coupling structure between a base and a stand in the display apparatus of FIG. 1.
Figure 3:
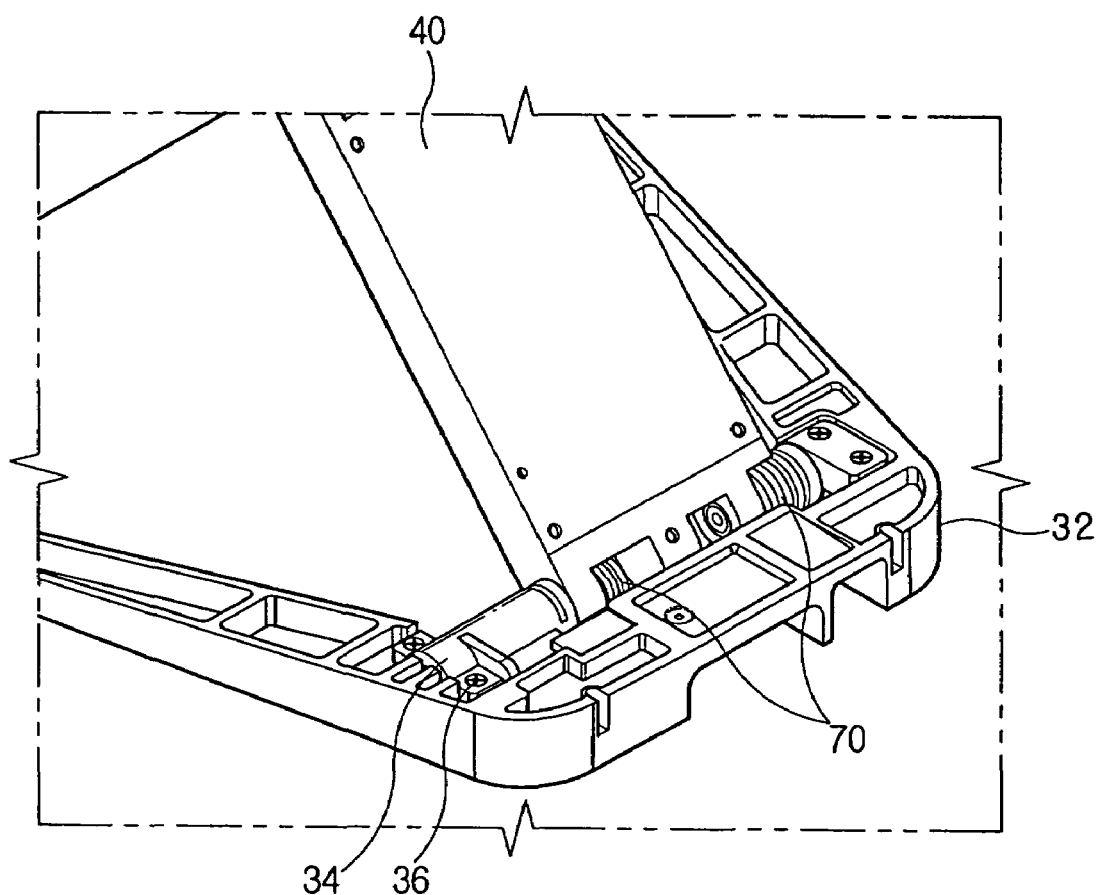
FIG. 3 is an assembled perspective view illustrating the base and the stand of FIG. 2.
Figure 4:
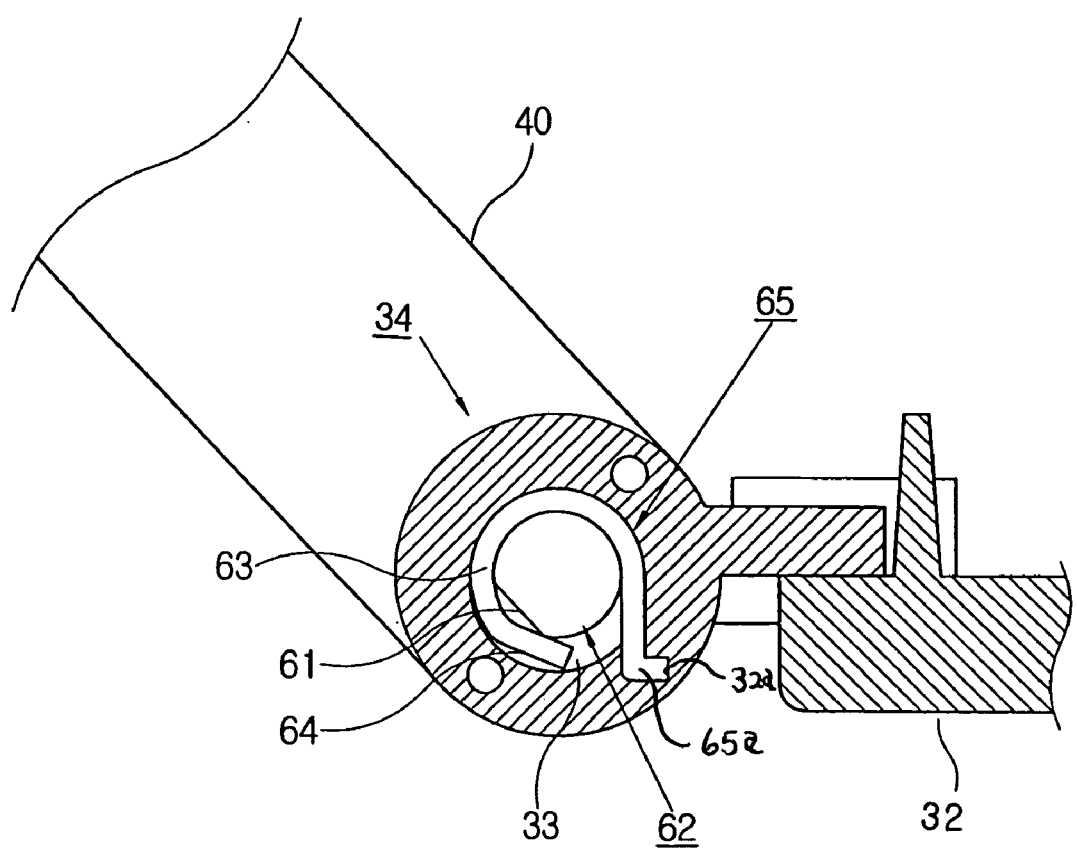
FIG. 4 is a lateral section view illustrating a hinge connected between the base and the stand in the display apparatus of FIGS. 1 and 2.

FIG. 1 is a rear perspective view illustrating a display apparatus according to an embodiment of the present general inventive concept, FIG. 2 is a partially exploded perspective view illustrating a coupling structure between a base and a stand in the display apparatus of FIG. 2, FIG. 3 is an assembled perspective view of the base and the stand of FIG. 2, and FIG. 4 is a lateral section view illustrating a hinge connected between the base and the stand in the display apparatus of FIGS. 1 and 2.

As shown in FIGS. 1-4, the display apparatus may comprise a display main body 20 to display a picture, a base 30 to stably support the display main body 20, a stand 40 to link the display main body 20 to the base 30, and hinges 50 and 60 to rotatably connect the stand 40 to both the display main body 20 and the base 30.

The stand 40 can allow the monitor main body 20 to be lifted and folded by the hinges 50 and 60. A structure of the hinge 60 will be described hereinafter. The hinge 50 may have the same structure as the hinge 60.

The hinge 60 can be supported by the stand 40 and rotatably coupled to the base 30, thereby allowing the stand 40 to be lifted about the base 30. The hinge 60 may comprise a shaft 62 and a friction unit 65. The shaft 62 can be formed with a contact portion 61 on an outer circumference thereof. The friction unit 65 inserted in the base 30 and surrounding the outer circumference of the shaft 62 may comprise a friction supporting portion 63 to frictionally support the shaft 62 being rotated when the display main body 20 is lifted, and a rotation holding portion 64 to elastically and closely contact the contact portion 61 of the shaft 62 when the display main body 20 is in a folded state, and to hold the shaft 62 from rotating.

The contact portion 61 may have a flat surface formed on the outer circumference of the shaft 62 along a longitudinal direction of the shaft 62. The rotation holding portion 64 is bent from the friction supporting portion 63 so as to elastically and closely contact a surface of the contact portion 61 by a rotation of the shaft 62.

The contact portion 61 of the shaft 62 and the rotation holding portion 64 of the friction unit 65 can be used for adding a structural friction to a general rotational friction. Thus, a toque due to the hinge 60 can be dualized according to whether the display main body 20 is operated by a user or a manufacturer, so that a user's convenience and a manufacturer's efficiency are increased.

The friction unit 65 can be made of a resilient material capable of creating a predetermined friction. For example, the friction unit 65 can be made of a clip spring having a bending end. However, the friction unit 65 is not limited thereto and may vary as necessary. The friction unit 65 may comprise a coupling portion 65a to be fixedly coupled to one of the supporting bracket 34 and the base main body 32 through a coupling groove 32a formed on the one of the supporting bracket 34 and the base main body 32. The friction unit 63 may be disposed in a space 33 formed between the supporting bracket 34 and the base main body 32.

The base 30 may comprise a base main body 32, and a supporting bracket 34 detachably coupled to a portion of the base main body 32 and formed with an insertion hole 33 in which the shaft 62 and the friction unit 65 are inserted. The supporting bracket 64 can be coupled to the base main body 32 by a screw 36.

Further, the display apparatus may comprise a torsion spring 70 to elastically keep a lifted state of the display main body. To keep a balance between the base 30 and the stand 40, two torsion springs 70 can be provided in left and right sides of the stand 40.

Figure 5A:
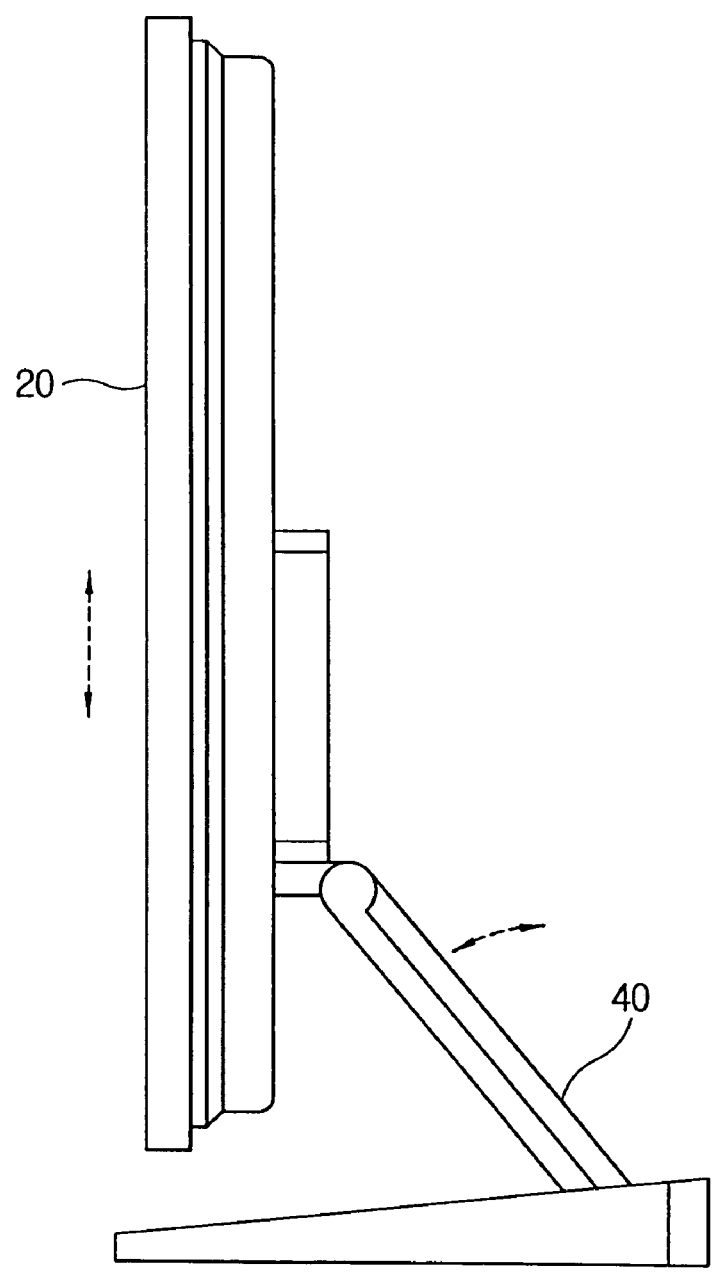
FIGS. 5A and 5B are views illustrating operations of a display main body and a hinge in a lifting operation of a display apparatus according to another embodiment of the present general inventive concept.
Figure 5B:
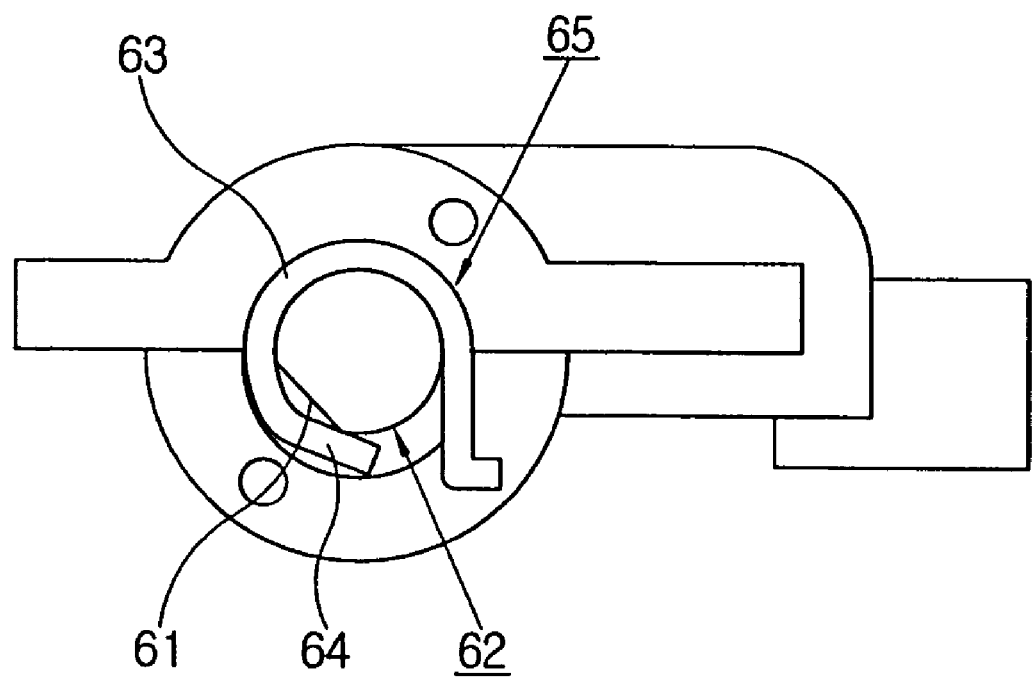

FIGS. 5A and 5B are views illustrating operations of a display main body and a hinge in a lifting operation of a display apparatus according to another embodiment of the present general inventive concept.

As shown FIGS. 1-5B, when the stand 40 is tilted with respect to the base 30 according to the lifting operation of the display main body 20, the shaft 62 interlocked with the stand 40 can rotate while being in contact with the friction supporting portion 63 of the friction unit 65, so that the display main body 20 is smoothly operated.

At this time, the contact portion 61 and the rotation holding portion 64 are not in closely contact with each other, so that only a rotational friction is created between the shaft 62 and the friction unit 65.

Figure 6A:
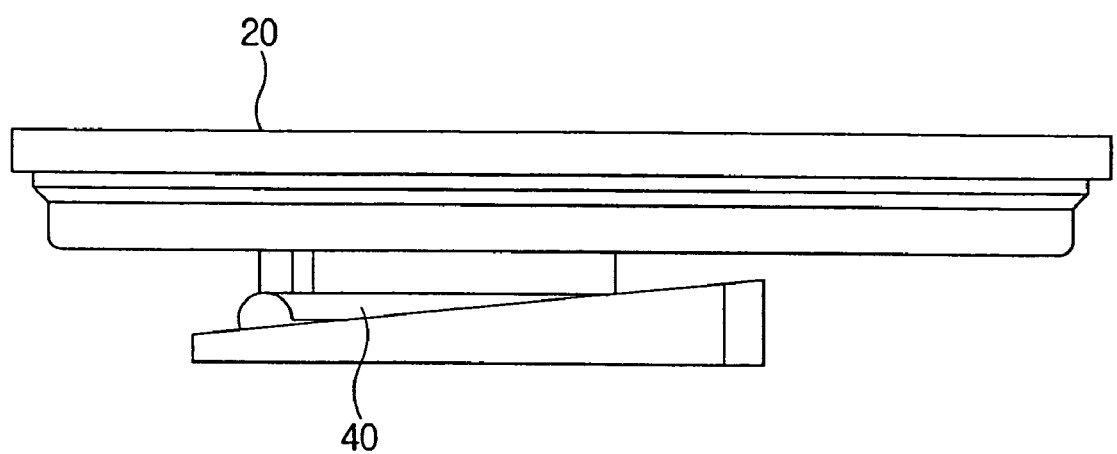
FIGS. 6A and 6B are views illustrating operations of a display main body and a hinge in a folded state of a display apparatus according to another embodiment of the present general inventive concept.
Figure 6B:
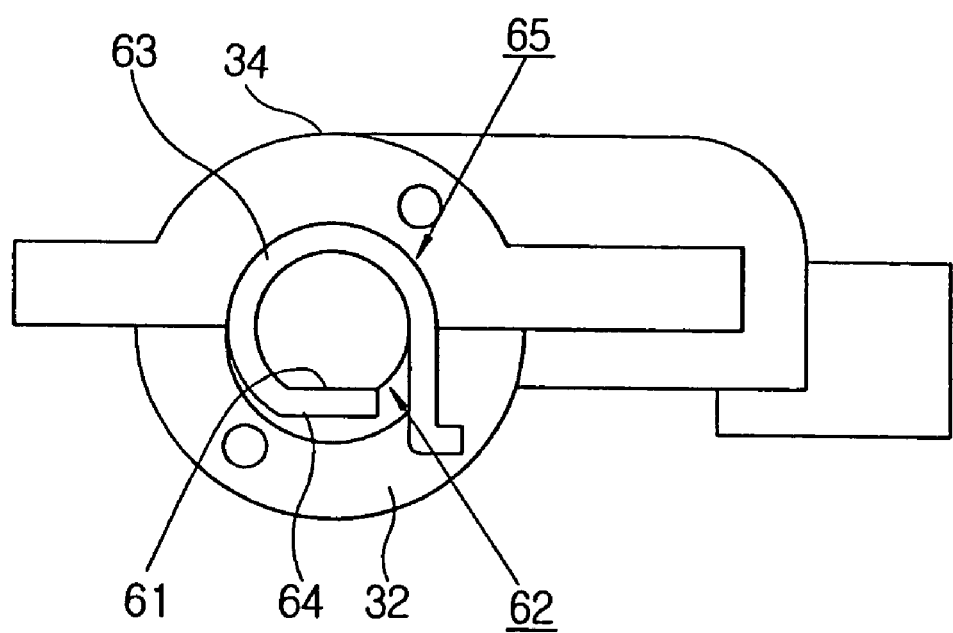

FIGS. 6A and 6B are views illustrating operations of a display main body and a hinge in a folded state of a display apparatus according to another embodiment of the present general inventive concept.

As shown in FIGS. 1-4 and 6A-6B, when the stand 40 is disposed parallel to the base 30 according to a folding operation of the display main body 20, the stand 40 can be folded to pack the display apparatus or to mount the folded display main body 20 to a wall.

At this time, the contact portion 61 of the shaft 62 and the rotation holding portion 64 of the friction unit 65 can be in elastically and closely contact with each other, so that the folded state of the display main body 20 is stably kept as long as more than a predetermined external force is not applied thereto.

Hence, both the rotational friction and the structural friction can be created between the shaft 62 and the friction unit 65, thereby maximizing the torque in a state where the display main body is folded.

As described above, the present general inventive concept can provide a display apparatus in which a display main body is smoothly operated when lifted, and is stably kept in a folded state when packed or mounted to a wall, thereby enhancing functionality and usability of the display apparatus.

Further, the present general inventive concept can provide a display apparatus in which a folded state of a display main body is stably kept without a separate holding unit, thereby enhancing usability and economic efficiency of the display apparatus.

Although a few embodiments of the present general inventive concept have been shown and described, it will be appreciated by those skilled in the art that changes may be made in these embodiments without departing from the principles and spirit of the invention, the scope of which is defined in the appended claims and their equivalents.

What is claimed is:

1. A display apparatus comprising a display main body; a base;
a stand to link the display main body to the base; and
a hinge rotatably connected to the base and the stand and to allow the stand to be rotated about the base, the hinge comprising,
   a shaft supported by the stand, rotatably coupled to the base, and formed with a contact portion on an outer circumference thereof, and
   a friction unit inserted in the base, surrounding the outer circumference of the shaft, and comprising a friction supporting portion to frictionally support the shaft being rotated when the display main body is operated, and a rotation holding portion to elastically contact the contact portion of the shaft when the display main body is in a folded state, and to hold the shaft from rotating.

2. The display apparatus of claim 1, wherein the contact portion comprises a flat surface formed along a longitudinal direction of the shaft, and the rotation holding portion is bent from the friction supporting portion to surface-contact of the contact portion.

3. The display apparatus of claim 2, wherein the friction unit comprises a clip spring.

4. The display apparatus of claim 3, wherein the base comprises:

a base main body; and a supporting bracket detachably coupled to a portion of the base main body to form an insertion hole in which the shaft and the friction unit are inserted.

5. The display apparatus of claim 1, wherein the friction unit comprises a clip spring.

6. The display apparatus of claim 5, wherein the base comprises a base main body, and a supporting bracket detachably coupled to a portion of the base main body to form an insertion hole in which the shaft and the friction unit are inserted.

7. A display apparatus comprising:

a display main body;

a base having a base main body, a space formed in the base main body, and a friction unit disposed in the space and having a coupling portion fixedly coupled to the base main body, a friction supporting portion extended from the coupling portion in a circular direction, and a rotation holding portion extended from the friction supporting portion in a linear direction and having a flat surface;

a stand disposed between the display main body and the base;

a first hinge unit to rotatably couple the stand to the display main body; and a second hinge unit to rotatably couple the stand to the base, and having a shaft formed on the stand to be inserted into the friction unit, the shaft having a circular portion to correspond to the friction supporting portion of the friction unit and a contact portion to correspond to the rotation holding portion of the friction unit, so that the stand is in one of a folded state and a lifting state.

8. The display apparatus of claim 7, wherein the shaft comprises a connection portion formed between the circular portion and the contact portion, and the circular portion of the shaft is in contact with the friction supporting portion while the connection portion contacts the flat surface of the rotation holding portion of the friction unit, in the lifting state.

9. The display apparatus of claim 7, wherein the circular portion of the shaft comprises a first portion to generate a first friction force with the friction supporting portion and a second portion to generate a second friction force with the rotation holding portion of the friction unit to maintain the monitor main body in the lifting state with respect to the base.

10. The display apparatus of claim 7, wherein the circular portion of the shaft is in contact with the friction supporting portion of the friction unit while the contact portion of the shaft contacts the rotation holding portion of the friction unit, in the folded state.

11. The display apparatus of claim 10, wherein the circular portion of the shaft generate a friction force with the friction supporting portion of the friction unit while the contact portion of the shaft generates a structural friction force with the rotation holding portion of the friction unit, in the folded state.

12. The display apparatus of claim 7, wherein the contact portion of the shaft is disposed parallel to the flat surface of the rotation holding portion of the friction unit in the folded state.

13. The display apparatus of claim 7, wherein the base comprises a wall formed in a circular surface to define the space, and the circular surface comprises a first circular surface to correspond to the circular surface of the friction supporting portion of the friction unit, and a second circular surface to correspond to the flat surface of the rotation holding portion of the friction unit.

14. The display apparatus of claim 13, wherein the second circular surface is spaced-apart from the flat surface of the rotation holding portion of the friction unit.

15. The display apparatus of claim 13, wherein the rotation holding portion of the friction unit moves between the shaft and the second circular surface of the wall of the base according to a rotation of the shaft.

16. The display apparatus of claim 7, wherein the contact portion of the shaft is disposed on a plane having an angle with a radial direction of a rotation center of the shaft.

17. The display apparatus of claim 7, wherein the contact portion of the shaft is disposed on a plane substantially perpendicular to a radial direction of a rotation center of the shaft.

18. The display apparatus of claim 7, wherein the contact portion of the shaft is disposed between opposite ends of the circular portion of the shaft and on a plane having an angle with a radial direction of a rotation center of the shaft.

19. The display apparatus of claim 7, wherein the linear direction of the rotation holding portion of the friction unit is disposed on a plane having an angle with a radial direction of the circular direction.

20. The display apparatus of claim 7, wherein linear direction of the rotation holding portion of the friction unit is disposed on a plane substantially perpendicular to a radial direction of the circular direction.

* * * * *